US008429687B2

(12) United States Patent
Civanlar et al.

(10) Patent No.: US 8,429,687 B2
(45) Date of Patent: Apr. 23, 2013

(54) SYSTEM AND METHOD FOR AN ACTIVE VIDEO ELECTRONIC PROGRAMMING GUIDE

(75) Inventors: Mehmet Reha Civanlar, Istanbul (TR); Ofer Shapiro, Fair Lawn, NJ (US); Tal Shalom, Fair Lawn, NJ (US)

(73) Assignee: Delta Vidyo, Inc, Hackensack, NJ (US)

( * ) Notice: Subject to any disclaimer, the term of this patent is extended or adjusted under 35 U.S.C. 154(b) by 224 days.

(21) Appl. No.: 12/821,782

(22) Filed: Jun. 23, 2010

(65) Prior Publication Data

US 2010/0333143 A1 Dec. 30, 2010

Related U.S. Application Data

(60) Provisional application No. 61/220,061, filed on Jun. 24, 2009.

(51) Int. Cl.
*G06F 3/00* (2006.01)
*G06F 13/00* (2006.01)
*H04N 5/445* (2011.01)

(52) U.S. Cl.
USPC ............. 725/41; 725/37; 725/38; 725/39; 725/40; 725/42; 725/43

(58) Field of Classification Search ............. 725/43
See application file for complete search history.

(56) References Cited

U.S. PATENT DOCUMENTS

| | | | |
|---|---|---|---|
| 5,555,244 A | 9/1996 | Gupta et al. | |
| 6,167,084 A | 12/2000 | Wang et al. | |
| 6,496,217 B1 | 12/2002 | Piotrowski | |
| 6,496,980 B1* | 12/2002 | Tillman et al. | 725/90 |
| 6,498,865 B1 | 12/2002 | Brailean et al. | |
| 6,643,496 B1 | 11/2003 | Shimoyama et al. | |
| 6,912,584 B2 | 6/2005 | Wang et al. | |
| 6,956,573 B1 | 10/2005 | Bergen et al. | |
| 6,973,622 B1 | 12/2005 | Rappaport et al. | |
| 7,012,893 B2 | 3/2006 | Bahadiroglu | |
| 7,548,565 B2 | 6/2009 | Sull et al. | |

(Continued)

FOREIGN PATENT DOCUMENTS

WO WO 2004/036916 A1 4/2004

OTHER PUBLICATIONS

U.S. Appl. No. 61/172,355, filed Feb. 24, 2009, Civanlar et al.

(Continued)

*Primary Examiner* — Justin Shepard
(74) *Attorney, Agent, or Firm* — Baker Botts LLP

(57) ABSTRACT

Techniques for transmission and preparation for display of real-time audio-visual content of a plurality of TV programs over electronic communications network channels and display of the audio-visual signals as a part of a TV Electronic Programming Guide (EPG) are disclosed herein. In particular, the use of video coded using a layered codec, and stored in a layered format, allows a properly configured system to present to an end user a live preview of multiple TV channels, along with EPG information (e.g., the channel, time, title and genre of video content, a list of programs scheduled in the future, as well as the ability to, for example, set parental controls, order pay-per-view programs, to search for programs based on theme or category, and to set recordings for the future when combined with a recording system), on his/her TV screen, without taking significantly more resources (e.g., in terms of bandwidth, system complexity) than the traditional digital TV transmission.

38 Claims, 5 Drawing Sheets

U.S. PATENT DOCUMENTS

| | | | |
|---|---|---|---|
| 7,593,032 | B2 | 9/2009 | Civanlar et al. |
| 7,987,491 | B2 * | 7/2011 | Reisman .................. 725/112 |
| 8,146,118 | B2 * | 3/2012 | Seo et al. .................. 725/41 |
| 2002/0051010 | A1 | 5/2002 | Jun et al. |
| 2002/0136162 | A1 | 9/2002 | Yoshimura et al. |
| 2002/0163918 | A1 | 11/2002 | Cline |
| 2002/0166122 | A1 | 11/2002 | Kikinis et al. |
| 2003/0067387 | A1 | 4/2003 | Kwon et al. |
| 2003/0074674 | A1 | 4/2003 | Magliaro et al. |
| 2003/0135631 | A1 | 7/2003 | Li et al. |
| 2004/0001479 | A1 | 1/2004 | Pounds et al. |
| 2004/0042549 | A1 | 3/2004 | Huang et al. |
| 2004/0071354 | A1 | 4/2004 | Adachi et al. |
| 2004/0073923 | A1 | 4/2004 | Wasserman |
| 2004/0086127 | A1 | 5/2004 | Candelore |
| 2004/0218816 | A1 | 11/2004 | Hannuksela |
| 2004/0221308 | A1 * | 11/2004 | Cuttner et al. ............. 725/46 |
| 2005/0135477 | A1 | 6/2005 | Zhang et al. |
| 2005/0147164 | A1 | 7/2005 | Wu et al. |
| 2005/0254575 | A1 | 11/2005 | Hannuksela et al. |
| 2005/0265450 | A1 | 12/2005 | Raveendran et al. |
| 2007/0094691 | A1 | 4/2007 | Gazdzinski |
| 2007/0121584 | A1 | 5/2007 | Qiu et al. |
| 2007/0162922 | A1 * | 7/2007 | Park ............................ 725/10 |
| 2008/0127258 | A1 * | 5/2008 | Walker et al. ............... 725/39 |
| 2008/0168523 | A1 | 7/2008 | Ansari et al. |
| 2008/0189744 | A1 * | 8/2008 | Schein et al. ............... 725/40 |
| 2008/0209472 | A1 * | 8/2008 | Shanks et al. .............. 725/43 |
| 2008/0263597 | A1 * | 10/2008 | Iki et al. .................... 725/43 |
| 2009/0025028 | A1 | 1/2009 | Cassanova et al. |
| 2009/0100466 | A1 * | 4/2009 | Migos ........................ 725/40 |

OTHER PUBLICATIONS (ITU-T H.264) "ITU-T Recommendation H.264: Advanced Video Coding for Generic Audiovisual Services "In: International Relecommunication Union (On Line, {URL: http://www.itu.int/rec/T-Rec-H.264/en} Mar. 1, 2005 entire document.

S. Wenger, "Video Redundancy Coding in H.263+", Workshop on Audio-Visual Services for packet networks (aka Packet Video Workshop), 1997, 6 pages.

Michael A. Smith "Video Skimming and Chracterization through the Combination of image and language Understanding Techniques," p. 775, 1997 IEEE Computer Society Conference on Computer Vision and Pattern Recognition (CVPR '97), 1997.

RTSP, RFC2326, available at http://www.rfc-editor.org/rfc/rfc2326.txt.

RTP, RFC3550, available at http://www.rfc-editor.org/rfc/rfe3550.txt.

RFC3170, http://www.rfc-editor.org/rfc/rfc3170.txt.

U.S. Appl. No. 12/765,815, filed Apr. 22, 2010.
U.S. Appl. No. 12/765,793, filed Apr. 22, 2010.
U.S. Appl. No. 12/765,767, filed Apr. 22, 2010.
U.S. Appl. No. 12/015,956, filed Jan. 17, 2008.
U.S. Appl. No. 11/608,776, filed Dec. 8, 2006.
U.S. Appl. No. 11/682,263, filed Mar. 5, 2007.
U.S. Appl. No. 12/015,945, filed Jul. 3, 2008.
U.S. Appl. No. 12/943,622, filed Nov. 10, 2010.

* cited by examiner

BASEBALL CHANNEL 4:20 pm

Boston Red Sox versus Yankees Game

WATCH SEGMENTS

Red Sox versus Yankees Round 1

Red Sox versus Yankees Round 2

Red Sox versus Yankees Notes and News

Key Pitching Scenes

SYSTEM AND METHOD FOR AN ACTIVE VIDEO ELECTRONIC PROGRAMMING GUIDE

CROSS-REFERENCE TO RELATED APPLICATIONS

This application claims the benefit of priority to U.S. Provisional Application Ser. No. 61/220,061, filed Jun. 24, 2009, which is hereby incorporated by reference herein in its entirety.

BACKGROUND

1. Technical Field

The disclosed invention relates to program navigation in compressed digital video delivery systems such as cable television (CATV), satellite television, Internet protocol television (IPTV) and the Internet based video distribution systems. In particular, it relates to the use of a low-delay and layered codec and the corresponding low-delay transport, typically used for videoconferencing systems, in connection with digital video delivery systems to enhance the navigation capabilities and user interface of Electronic Programming Guides (EPGs)/Interactive Programming Guides (IPGs) by showing audio-visual content of the actual program in addition to meta-information about the audio-visual content, such as, for example, the program's title, description, genre of video content, channel, or time.

2. Background Art

Subject matter related to the present application can be found in co-pending U.S. patent application Ser. Nos. 12/765,815, filed Apr. 22, 2010 and entitled "An Efficient Video Skimmer"; 12/765,793, filed Apr. 22, 2010 and entitled "Systems, Methods and Computer Readable Media for Instant Multi-Channel Video Content Browsing in Digital Video Distribution Systems"; 12/765,767, filed Apr. 22, 2010 and entitled "Systems, Methods and Computer Readable Media for Instant Multi-Channel Video Content Browsing in Digital Video Distribution Systems"; 61/264,466, filed Nov. 25, 2009 and entitled "IPTV Presence And Interaction Protocol"; and 61/289,249, filed Dec. 22, 2009 and entitled "System And Method For Interactive Synchronized Video Watching"; 12/015,956, filed Jan. 17, 2008 and entitled "System and Method for Scalable and Low-Delay Videoconferencing Using Scalable Video Coding"; 11/608,776, filed Dec. 8, 2006 and entitled "Systems and Methods for Error Resilience and Random Access in Video Communication Systems"; and 11/682,263, filed Mar. 5, 2007 and entitled "System and Method for Providing Error Resilience, Random Access and Rate Control in Scalable Video Communications"; and U.S. Pat. No. 7,593,032, filed Jan. 17, 2008 and entitled "System and Method for a Conference Server Architecture for Low Delay and Distributed Conferencing Applications". All of the aforementioned related applications and patents are hereby incorporated by reference herein in their entireties.

An Electronic Programming Guide (EPG), alternatively known as an Interactive Programming Guide (IPG) or Electronic Service Guide (ESG), is an application that can be used, for example, in connection with CATV, satellite television, digital video recorders, and TV set-top boxes to view a list the current and scheduled programs that are or will be available on each TV channel. An EPG can be viewed as an electronic equivalent of a traditional print or paper TV guide.

An EPG is displayed on a video display, for example, a TV or computer monitor, and can be controlled through an input device, such as a TV remote control, computer mouse, keyboard or other input device. Menus are provided to allow the TV user, alternatively known as a TV viewer, to navigate, select, and discover data about video content (alternatively known as video programs/programming, programs, or audio-visual content) including, for example, the program's channel, time, title or genre, and even view a list of programs scheduled for the next few hours or the next several days. A typical EPG can include options to, for example, set parental controls, to order pay-per-view programs, search for programs based on theme or category, or set recordings for the future when combined with a recording system. EPG can be used for scheduled broadcast TV as well as Pay per View (PPV) and Video on Demand (VoD) services.

By navigating through an EPG, users can see more information about the current programs on TV channels and about future and past programs. When EPGs are connected to a recording system, such as personal video recorders (PVRs), they enable a viewer to plan his or her viewing and record broadcast programs to a hard disk or network based storage for later viewing.

The on-screen information presented by the EPG can be delivered by a dedicated channel or assembled by the receiving equipment from information sent along with content by each individual program channel.

In the analog domain, EPG standards were developed by the European Telecommunications Standards Institute (ETSI) using a protocol infrastructure based on Teletext (ETS 300 707/708). In traditional Digital Video Broadcast (DVB), EPG information supports programming metadata as defined in the Specification for Service Information in DVB Systems (ETSI ETS 300 468) as a pure push service. The service discovery, selection and description for DVB services over IP can be a push or a pull service. Recently, ETSI has been actively developing IPTV (DVB-IPTV) standards which also include metadata definitions for a broadband content guide (DVB-BCG, ETSI TS 102 539).

An EPG can include a graphical user interface (GUI), which enables the display of channel names and program start times and titles, as well as additional descriptive information such as a program's synopsis, actors, directors, year of production, etc., which is particularly useful in VoD and PPV services.

EPG information can be displayed as a timetable that displays program titles on a two-dimensional grid, where the two axes represent channel name and time (e.g., hour/minute). The EPG can provide the user with the following exemplary options:

(1) select more information on each program by clicking on the program title using an input device,
(2) directly switch to a program on a channel,
(3) switch to a future program when it starts, or
(4) set a recorder to record the selected program.

The user can scroll up and down within the EPG to see information about programs available on additional channels (assuming channel is the vertical axis) or can scroll sideways to see information about programs available at different periods of time (assuming time is the horizontal axis). The EPG can allow the viewer to browse program summaries, search by genre or channel, and have immediate access to the selected program. More advanced EPGs can include alphanumeric search capabilities.

The EPG for VoD or PPV services can have a GUI that is different than the two dimensional grid used to display information for broadcast channels, such as classification by type or genre (e.g., comedy, drama, action, series, etc.), or alphabetical ordering of the available video content by title.

The latest evolution in EPGs is a personalized EPG which uses semantics to recommend video programs to one or multiple users based on their interests. A personal EPG can allow a user to use or create custom skins (like a desktop image on a personal computer) and knows what a user likes to watch based on previous choices and relevant feedback collected from the user. It can also facilitate the recording of these programs so that the user no longer has to depend on a broadcaster's time schedule, but can watch a program at the time of the user's choice, known as time shifting.

EPG data can be sent within the broadcast transport stream, or alongside in a special data channel. Many EPG systems, however, rely upon third party "metadata aggregators" to provide good quality data content. Newer media centers (e.g., personal computer based multi-channel TV recorders) and DVRs can use the Internet to provide a feed for the EPG data. This enables two-way interactivity such that the user can request media download via the EPG or a related link.

EPGs are widely used in satellite and CATV systems to guide users to TV channels without the use of paper. Although EPGs have become more sophisticated by providing significant amounts of metadata and menu options to display different levels of information about video content (e.g., the channel, time, title and genre of video content, a list of programs scheduled in the future, as well as the ability to, for example, set parental controls, order pay-per-view programs, search for programs based on theme or category, or set recordings for the future when combined with a recording system), most of this information is in textual format and, in some cases, disjointed from the actual audio-visual content being shown. Stated differently, most EPGs currently do not carry the actual audio-video content—only separate meta-information about the content—which many users perceive as inadequate to describe the details of the program. The program listing is prepared, provided, and often downloaded to the user's infrastructure well in advance by the channel/content owner; hence real-time changes in actual programming may not be reflected in the program metadata.

In developing the EPG software, manufacturers include functions to address the growing volumes of increasingly complex data associated with TV programming. This data can include, for example, program descriptions, schedules, and ratings, and user configuration information, such as favorite channel lists, multimedia content, and parental controls. To meet this need, some set-top box software designs incorporate a "database layer" that utilizes either proprietary functions or a commercial, off-the-shelf embedded database for sorting, storing, and retrieving programming data.

Incorporating the "content surfing" experience into an EPG by carrying the video content along with the EPG requires sending lower resolution versions of the video content to fit into Mini Browsing Windows (MBWs). Briefly put, an MBW is a small window in a GUI which can show motion video of a program. While size, number, and location of MBWs on the screen can be user-defined, this invention envisions the simultaneous presentation of multiple MBWs. As the number of broadcasting channels and amount of available video content grow to very large numbers, it becomes impossible to carry the entire set of programs of interest to everybody, as in the digital video distribution architecture of CATV.

Traditional video codecs used in CATV or IPTV systems (e.g., MPEG-2 main profile) are designed with single layer coding, which provides only a single bitstream at a given bitrate. If a lower spatial resolution is required (such as for the smaller frame size of an MBW), the full resolution signal is first received and decoded at the receiving end, followed by a sub-sampling operation to produce a lower resolution version, thus wasting significant bandwidth and computational resources. In particular, if an Active Video EPG (AVEPG) were to enable the preview of n channels, using traditional, full resolution video, the network capacity to the receiver running the AVEPG would have to be n times as high. Some prior art systems mix down-scaled video content at the sender site, and convey a single full resolution video signal to the receiver, which looks somewhat like an AVEPG. However, without requiring an unreasonably high amount of resources at the sender side, this technique does not allow for a per-user configuration of the AVEPG; that is, user preferences cannot be accommodated, or can only be accommodated to a limited extent. The invention disclosed overcomes both limitations.

Increases in video-program-switching (alternatively known as channel surfing) times also make program changing within an AVEPG more difficult. Digital video codecs, alternatively known as digital video coding/decoding techniques, (e.g., MPEG-2, H-series codecs such as H.263 and H.264 baseline or main profile, and packet network delivery) have increased program-switching times primarily for the following two reasons:

(1) Transport Delays: These delays result from buffering at the decoder at the receiving end, which is necessary to alleviate the effects of: (a) delay jitter caused by varying queuing delays in transport network switches; (b) packet losses in the network; and/or (c) bandwidth changes in the transport network (such as variable link bandwidths experienced in wireless networks).

(2) Encoding Delays: To display a video, the decoder at the receiver must receive an I-frame, alternatively known as an intra-coded frame, from the encoder before a video can be decoded (techniques avoiding I-frames, such as gradual decoder refresh, imply even longer delays). In broadcast environments, the time distance between I-frames in a bitstream is fixed (for example, 0.5 sec or more) to improve coding efficiency. Therefore, when a user changes a program, it can take as long as 0.5 seconds or more before the receiver can start decoding the audio-visual content. Furthermore, the encoders used in TV systems use "future frames" as well as "previous frames" as references to efficiently compress the current frame. As such, the decoder must wait for both the I-frame and the future reference frames to arrive so that the frames are generated in the correct sequence, causing inherent delays in the instant display of a new program.

In contrast to satellite and CATV systems, IPTV and other packet network-based video distribution systems also incur annoying transport delays, which can be significant—in the order of seconds to tens of seconds. In the evolving IPTV environment, the channel-change time has become significantly longer particularly when channels are delivered over a best effort network, such as the Internet, where the network conditions are completely unpredictable.

Layered coding or scalable coding is a video compression technique that has been developed explicitly for heterogeneous environments. In such codecs, two or more layers are generated for a given source audio-visual signal: a base layer and at least one enhancement layer. The base layer offers a basic representation of the source signal at a reduced quality, which can be achieved, for example, by reducing the Signal-to-Noise Ratio (SNR) through coarse quantization, using a reduced spatial and/or temporal resolution, or a combination of these techniques. The base layer can be transmitted using a reliable channel, i.e., a channel with guaranteed or enhanced quality of service (QoS). Each enhancement layer increases the quality by increasing the SNR, spatial resolution, or temporal resolution, and can be transmitted with reduced or no QoS. In effect, a user is guaranteed to receive a signal with at least a minimum level of quality of the base layer signal.

Accordingly, there exists a need for techniques for transmitting audio-visual signals using a low-delay and layered codec and the corresponding low-delay transport to enable AVEPG displays with specific requirements, i.e., multiple resolutions and rapid program switching.

SUMMARY

Techniques for transmission and preparation for display of real-time audio-visual content of multiple TV programs to be displayed in an Electronic Programming Guide (EPG) over one or more electronic communications network(s) are disclosed herein. In particular, the use of video coded using a layered codec, and stored in a layered format, allows a properly configured system to present to an end user a live preview of multiple TV channels, along with EPG information, on his/her video display (e.g., a TV or computer monitor), without taking significantly more resources (e.g., in terms of bandwidth, system complexity) than the traditional digital TV transmission.

In one exemplary embodiment, a video server and Active Video EPG (AVEPG) system are disclosed. The system can include an AVEPG video extractor, configured for extracting encoded audio-visual signals of different resolutions from at least one video database, which can include stored scalable encoded video (i.e., video in a base layer and enhancement layer format).

In the same or another embodiment, the system can distribute the signals over one or more electronic communications network channels.

In the same or another embodiment, the system can include an AVEPG control logic server configured to receive one or more control messages from AVEPG control logic clients attached to least one receiver, and can invoke the video extractor to extract and send appropriate audio-visual signals for display to the at least one receiver.

In the same or another embodiment, the system can include an AVEPG control logic client located at a receiver configured to combine an EPG function with the preparation of audio-visual content for display.

In the same or another embodiment, the AVEPG control logic client can act on a user action made via an input device (such as a pointing device, mouse, keyboard, remote control, or other input device) by sending at least one message to an AVEPG control logic server.

In the same or another embodiment, the AVEPG control logic server can be configured to receive at least one message from an AVEPG control logic client, and, in reaction to the message, to send at least one audio-visual information stream.

In the same or another embodiment, the system can include a layered video encoder for encoding audio-visual signals representing live content from a camera. The encoded audio-visual signals can include a video base layer and at least one enhancement layer, and can be used for live transmission or for storing in a recorded video database ready for distribution over the electronics communications network channels at different resolutions—for example, a high resolution content for display on the main screen and lower resolution for display on AVEPG for channel browsing—at a later time.

In the same or another embodiment, the system can include a recorded video database, which stores audio-visual signals, e.g., in base layer and enhancement layer format, for past and future programs prepared for display within the MBWs of the AVEPG and the main screen.

In the same or another embodiment, the AVEPG video extractor can be distributed over more than one physical server.

In the same or another embodiment the AVEPG control logic server can be distributed over more than one physical server.

In the same or another embodiment, the system can also include a layered transcoder to transcode in real-time audio-visual signals from a video database, where the database stores audio-visual signals encoded in a format other than base layer and enhancement layer format.

Methods for preparation, distribution, and display of actual, real-time audio-visual content of TV programs into an AVEPG over an electronic communications network are disclosed.

Also disclosed are computer-readable media comprising instructions arranged such that, when executed on a CPU, DSP, or other programmable component, executes the aforementioned methods.

The accompanying drawings, which are incorporated and constitute part of this disclosure, illustrate exemplary embodiments of the disclosed invention and serve to explain the principles of the disclosed invention.

Figure 1:
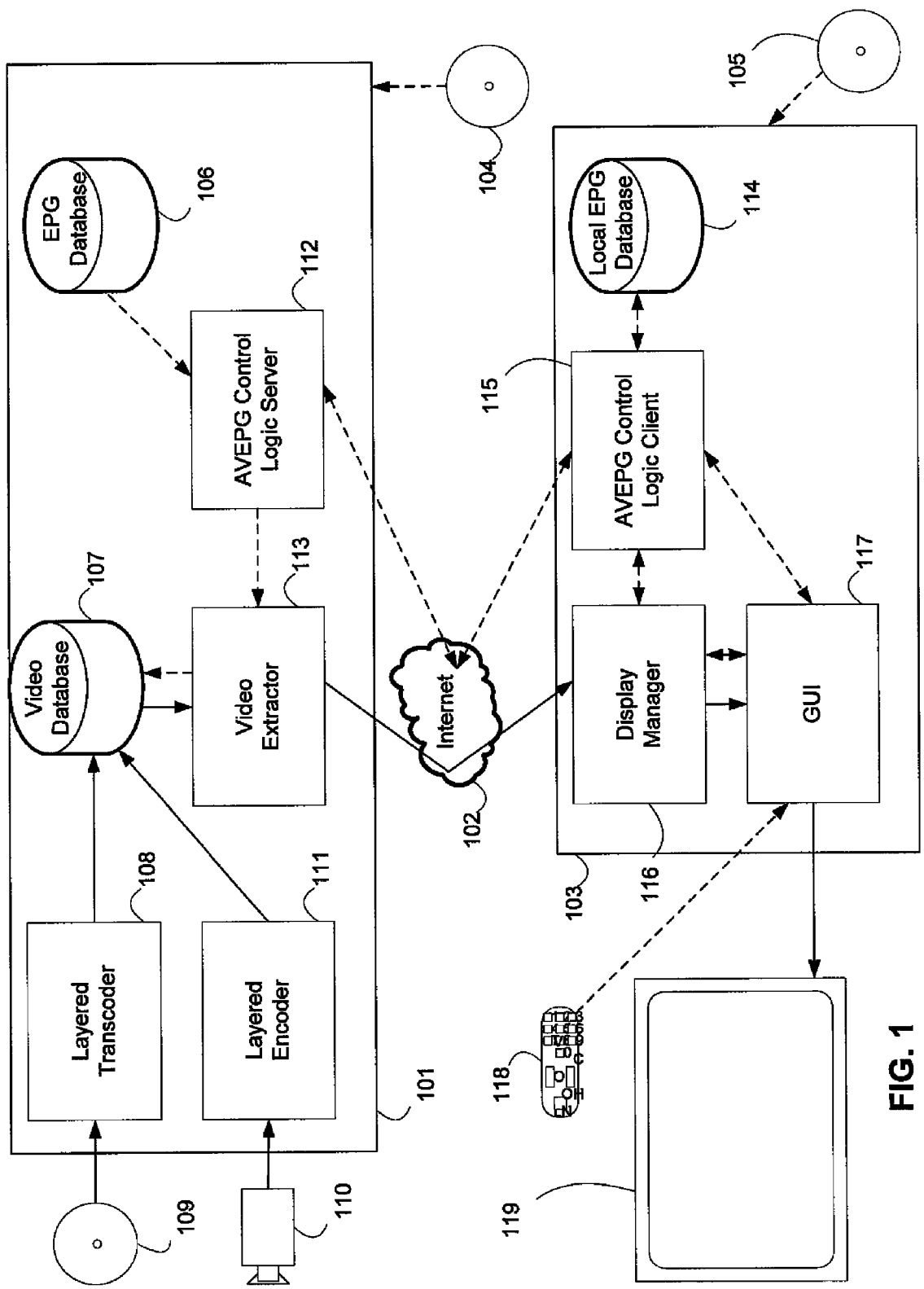
FIG. 1 is a block diagram illustrating an exemplary system for distribution and display of AVEPG audio-visual signals in accordance with the present invention.

Throughout the drawings, the same reference numerals and characters, unless otherwise stated, are used to denote like features, elements, components or portions of the illustrated embodiments. Moreover, while the disclosed invention will now be described in detail with reference to the figures, it is done so in connection with the illustrative embodiments.

DETAILED DESCRIPTION

The present invention provides techniques for transmission and preparation for display of real-time audio-visual content of multiple TV programs or channels to be displayed in an Active Video Electronic Programming Guide (AVEPG). This advanced form of an EPG generates the search and discovery EPG mechanisms from the actual, real-time audio-visual content of multiple channels. In other words, the AVEPG system takes content as it is broadcasted, and converts it, in real time, into a format that allows the user to preview multiple channels—showing different audio-visual content simultaneously—and make his/her selection from these channels. An AVEPG thus elevates the significance of audio-visual content on the display throughout the entire viewing cycle—starting from when the user turns on the video display (e.g., TV or computer monitor), through search and discovery, to watching a program—and by doing so, it improves the user experience of the EPG.

An AVEPG includes a traditional EPG and a "channel surfing" mechanism, both merged into a single utility, which is unlike a traditional EPG where the audio-visual content and EPG are separate applications.

An AVEPG provides a user with the ability to browse a set of channels and a set of times on each channel while watching the actual, real-time audio-visual content in MBWs. The user can change the set of channels and the set of times, forward and backward, and instantly switch to a selected time and channel/program to bring it to the main screen. Thus, the disclosed techniques provide a significant enhancement over current text-based EPGs.

In order to achieve the features of the AVEPG, the exemplary digital audio-visual distribution system uses low-delay and layered codec and its associated low-delay transport and random entry features, for example, as described in co-pending U.S. patent application Ser. Nos. 12/015,956, 11/608,776, and 11/682,263 and U.S. Pat. No. 7,593,032. The present invention avoids the buffering and inherent encoding delays of a classical digital video distribution system. These techniques eliminate the need for receiver buffering by introducing slight performance degradation in the event of packet loss or excessive packet delay. In addition, the techniques instantly generate synchronization frames without any need for future reference frames reducing the algorithmic delay.

Transporting the actual audio-visual content into the AVEPG means carrying a lower resolution version of the content suitable for display in the MBWs of the AVEPG, which are smaller than the size of the full screen, alternatively known as the main window, of the video display. The present invention reduces the bandwidth usage and processing complexity by generating multiple layers of audio-visual content and using only the lower layers to display audio-visual content in the AVEPG MBWs. These lower layers represent lower resolutions, lower frame rate, or lower SNR. Furthermore, a layered codec provides rate matching to account for the fact that different channels can use network connections with different bandwidths, which requires different data rates from the encoder.

While the traditional EPG typically has two major dimensions, namely channel and time, the AVEPG adds a third dimension: video program content, which can be presented in an MBW in the form of a motion video. The AVEPG requires a lower resolution version of the video program content due to the smaller size of an MBW when compared to the full screen. The video program content can be available in MBWs for pre-recorded or live programs that are currently being broadcasted. In other words, if the content type is "live" (i.e., produced at the time of watching the program) such content can be shown at the time of broadcast and afterwards, regardless of whether it is displayed on the full screen or in an MBW.

When a channel is displayed in an MBW, a user can browse the channel across time. For example, an AVEPG system can be configured to enable a four day time window for preview, two days before the current time, and two days after. By dragging a cursor on the time axis of an MBW, a user is able to "surf" the channel in the time domain. The time axis can be in a linear scale or, when large time windows are involved (e.g., several days), in a logarithmic scale.

While a user can change the focus of his/her visual attention between single MBWs, an analogous focusing is much harder in the audio sense. Accordingly, in the same or another embodiment, the audio content corresponding to a program displayed in an MBW can be activated when the user uses an input device to select, or "click on", a particular MBW. Otherwise, the videos are presented without audio so that multiple MBWs, each displaying different video content, can be simultaneously displayed without simultaneous playing of the corresponding audio.

Key aspects of the AVEPG are as follows:

(1) AVEPG can use actual real-time program audio-visual content (along with descriptive data related to the content) for navigation across time and channel axes. As the user moves across the time axis, the actual video content can be prepared for presentation, and displayed, corresponding to the programs at specific time instances.

(2) Using an AVEPG, a user can navigate backward in time (like the recall and playback function of a VoD system) as well as navigate forward in time (for previews of future time slots).

(3) With the backward navigation, the AVEPG technically enables a straightforward integration of VoD services for older content. A user can browse backward in the AVEPG to watch a desired show that has aired in the past. From a user's perspective, this can eliminate the need to record TV channels locally for "catch-up" TV function (e.g., as in the digital video recorders such as those marketed by TiVo). Of course, VoD infrastructure needs to be deployed elsewhere to support this function.

(4) With forward navigation, the AVEPG technically enables the delivery of the next episode of a TV series that is scheduled to be on-air, e.g., next week's episode. This functionality can enable new TV business models. For example, it is conceivable that a TV station could offer a premium service for "future releases", and users could pay to watch the next episode in its entirety rather than getting just a preview. This functionality can change how TV programs are monetized.

(5) The AVEPG adds a new dimension to the traditional two-dimensional grid that displays time and channel. AVEPG enables the user to surf multiple channels by, for example, horizontally scrolling to change the covered time interval, and vertically scrolling to change the covered channels.

(6) In contrast to prior art systems that, at a first glance, seemingly cover a similar application space as the AVEPG, a user can, for example, change the channels and the time interval covered in the AVEPG screen and/or adjust the MBW sizes for the live simultaneous video displays, so to accommodate viewing preferences and or other constraints (e.g., screen size, viewing distance).

The implementation of the AVEPG functionality is greatly facilitated by the use of video encoding and decoding technologies not traditionally found in today's IPTV or CATV systems. In particular, the video coding technology and the surrounding implementations should support:

(A) multiple resolutions of video content (for display on the main screen and MBWs), (B) instant resolution switching from an AVEPG MBW to main video display, providing instant higher resolution video corresponding to the lower resolution preview video in the MBWs, and (C) instant program switching along the channel-axis or time-axis of the AVEPG as the user is browsing programs.

A layered coding technology and an appropriate low delay transport fulfill these requirements. Co-pending U.S. patent application Ser. No. 12/765,793 discloses an architecture, and co-pending U.S. patent application Ser. No. 12/765,767 discloses technologies, enabling fast channel switching.

In one embodiment of the AVEPG, the user perception of a textual EPG is augmented with MBWs showing video content of the channels. In the same or another embodiment, the EPG logic located in the receiver can obtain EPG metadata about channels and programs as disclosed in prior art. When the receiver displays the EPG, the system additionally displays a clickable MBW at each start time marker. Within each MBW, the video content plays in a muted mode. If the user clicks on a specific MBW, the user is provided with the options of:

(1) previewing the selected MBW with audio enabled, (2) switching the video of the selected MBW to the main screen for viewing in its full resolution, and/or (3) changing the display of the AVEPG to show a preview of different segments of the selected video program at different time-markers or event-markers. When the user clicks on any of the MBWs which each show a different segment of the same video program, the full-resolution video starts playing at that specific marker (similar to the chapter selection functionality in a DVD).

In order to provide the capabilities of the AVEPG, significant changes are needed in video distribution, alone or in combination. In particular, an encoder is advantageously employed that can: (a) not generate a synchronization frame (i.e., I-frame of the prior systems) at fixed intervals, but rather only upon request from a receiver or intermediary network element; (b) employ zero or only a small number of future frames for video compression, so to minimize algorithmic delay; and (c) compensate for potential packet loss or insurmountable delay through the generation of a robust video bitstream, rather than relying on receiving end buffering and/or re-transmission as the sole mechanism for error resilience.

Because transport delays can cause significant impact to video-program-switching time, use of a generic video teleconferencing codec in combination with traditional IPTV-type streaming technologies alone may not completely eliminate the aforementioned program-change delay problems. A layered codec, however, in combination with adequate transport technologies does fulfill the requirements mentioned.

The invention presented provides techniques for the distribution and display of digital audio-visual signals, for example, pre-stored video files and TV programs, in a way that provides for effective video content searching and browsing, such as an EPG, and is well suited for any generic digital video distribution system, including those that use packet networks (e.g., IPTV) or the Internet (e.g., video services available on the Internet). Specifically, the techniques provide for a digital video distribution system that allows for display of digital audio-visual signals using a plurality of MBWs of different sizes and numbers that simultaneously display several channels or video programs as part of an EPG.

In one embodiment, the MBW sizes used in the EPG can be fixed and pre-set by the TV service provider. Alternatively, the user can have a configuration option to select the number and the size of MBWs used in the EPG.

In FIG. 1, as well as in other figures throughout this disclosure, solid arrows indicate media data flow, and dashed arrows indicate control message flow.

FIG. 1 illustrates an exemplary architecture of a system that enables an AVEPG in accordance with an embodiment of the invention. A server (101) is operated by a service provider, such as a TV network, and is typically located on the service provider's premises or at strategically chosen physical locations "in the network" (i.e., in main data centers next to major network hubs). A suitable network (102), for example, the Internet, is used to connect one or more clients (103). The clients (103) are located on the user's premises, and can take the form of, for example, a general purpose PC running appropriate software, a game console, a set-top-box, or other suitable hardware and/or software combinations.

While the suitable network (102) illustrated in FIG. 1 is the Internet, the video server (101) and attached receiver (103) can also communicate over one or more other networks, for example, another IP network, a packet network, a combination of a private IP network and the Internet, or a private network. It is further conceivable that media traffic, such as the traffic between a video extractor (113) and a display manager (116), can be sent over one network, and control traffic such as the traffic between an AVEPG control logic server (AVEPG-CL-S) (112) and AVEPG control logic client (AVEPG-CL-C) (115) over another network.

Both server (101) and client (103) can contain programmable devices, such as CPUs, DSPs, FPGAs, and so forth. Those programmable devices can receive instructions from computer readable media (104, 105) to enable their operation.

In one embodiment, the server (101) can include the following components: An EPG database (106) stores the EPG in the form of metadata, for example, in XML format. The content of the EPG database can be generated automatically from information available elsewhere in the service provider's operation, or can be manually maintained. This metadata can include information associated with video content, such as, for example, video program titles, genre, production year, parental control information, access limitations (i.e., per usergroup or per-user permissions to view in MBW or full screen format), or planned and actual broadcast time. A video database (107) contains the actual footage (i.e., audio-visual content), which can be stored in a layered encoding format, wherein, advantageously, the base layer can be suitable for presentation in low resolution MBWs, and the base layer in conjunction with at least one enhancement layer can be suitable for full screen display in full resolution.

Very little pre-recorded footage is available today in a layered format. Accordingly, to store footage arriving on digital media (such as a DVD, a D1 tape, a Betacam tape, or other digital media) in the video database (107), it first needs to be converted into a layered format. This can be implemented in a layered transcoder (108) that takes its input from a suitable media and an associated player, such as a DVD (109). Some service providers are also interested in presenting live footage. In this case, the camera (110), producing uncompressed video, can be connected to a layered encoder (111) that produces a layered format directly. To enable live transmission, the video database (107) can be configured to make available incoming compressed video to its output after only a minimal delay. The camera (110) is only one example for a content source that uses uncompressed video; other sources with similar characteristics, such as satellite downlinks, or the output of decoders of other video compression technologies, can equally be connected to the layered encoder (111). The use of the layered encoder is also not exclusively restricted to live video transmission; it can also be utilized to store content in the video database in a layered format for future use.

The server (101) receives through the network (102) control messages from connected client(s) (103). These control messages can be processed by an AVEPG-CL-S (112). The AVEPG-CL-S (112) further receives input from the EPG database (106); specifically, this input can contain the information of the programming of the service provider, and association metadata that helps matching the programming information for a given channel at a given time with a record of audio-visual information stored in the video database (107). Upon messages received from the client (103) and/or out of the AVEPG-CL-S's own initiative (e.g., to implement an audio-visual "wakeup call" at the client's site), the AVEPG-CL-S (112) instructs the video extractor (113) to extract certain audio-visual information in a certain format (e.g., in a resolution suitable for MBWs, full resolution, with or without audio, etc.) from the video database (107). The video database (107) responds to those requests by streaming the requested audio-visual content through the video extractor (113) through the network (102) to the client(s) (103). Even for a single client (103), many streams of audio-visual content can be streamed simultaneously to feed numerous MBWs.

Still referring to FIG. 1, the client (103) operation shall now be discussed. In the same or another embodiment, the client (103) can include a local EPG database (114), an AVEPG-CL-C (115), a display manager (116), and a GUI (117). The user interacts with the client (103) through a suitable input device (118), and rendering devices such as a display (119) and speakers (not depicted). The suitable input device (118) can be in the form of a remote control, a keyboard, mouse, other pointing device, or a combination of these. The display (119) can be a TV, computer monitor, or any other display device(s) capable of displaying motion video in full resolution and/or MBWs.

A user can interact with the AVEPG system by issuing commands on the input device (118). The commands from the input device (118) are received by the GUI (117). On some commands, such as the relocation of MBWs on the display (119), the GUI (117) can be acted on without further interaction with other system components. In other cases, however, the GUI (117) can exchange messages with a display manager (116). The display manager (116) is, among other things, responsible for receiving audio-visual content from the network (102) and locally processing (including decoding) the content for display by the GUI (117). Both the GUI (117) and the display manager (116) communicate with the AVEPG-CL-C (115). One task of the AVEPG-CL-C (115) is the interaction with its counterpart in the server, i.e., the AVEPG-CL-S (112), through the exchange of messages over the network (102). Some details of the commands and resulting message flow are discussed later in the disclosure; however, a few broad categories shall be mentioned here.

A first category of message flow includes messages intended to create and update the local EPG database (114). The local EPG database (114) can be seen as a cache of the contents of the server EPG database (106) that are both relevant to the client (103) and accessible based on the user's credentials. The user's credentials can include information such as, for example, which channels are available to the user (e.g., based on a pay-per-channel plan), or which VoD content is available (e.g., based on a pay per view plan). Keeping cached information locally at the client (103) both minimizes traffic over the network (102) and speeds up the operation of the client (103).

A second category of message flow includes those that are, after suitable processing, forwarded from the user through the input device (118), GUI (117) and AVEPG-CL-C (115). One exemplary message in this category is the message flow starting when a user selects, or "clicks on", an MBW. The GUI (117) forwards the selection or "clicking" information from the input device (118) to the display manager (116). The display manager (116) knows the current cursor position on the video display (119), and can associate this cursor position with the MBW and thereby with the content. Thereafter, the display manager (116) can exchange messages with the AVEPG-CL-C (115) instructing that the user wishes to view the content identified by the MBW in full screen resolution in the main window. The AVEPG-CL-C (115), after consulting with the local EPG database (114) (e.g., to determine whether the user has proper permissions or access rights, e.g., parental controls, to watch this content full screen), can grant the request based on its information, and exchange messages with the AVEPG-CL-S (112). The AVEPG-CL-S (112) can, as a result of this interaction, instruct the video extractor (113) to extract all layers required to display the requested content in the full screen, and stop extracting the information related to the MBWs that were previously displayed. As a result, the video extractor (113) can commence sending all layers required for full screen display over the network (102) to the display manager (116). The display manager (116) decodes the full screen image and forwards it to the GUI (117) for full-screen rendering on the video display (119). More examples of this category of message flow will be discussed in conjunction with FIG. 3 below.

While other protocol architectures can be used, in the same or another embodiment, the media traffic between the video extractor (113) and the display manager (116) follows the RTP specification [RFC 3550] and its associated payload specifications. The RTP packets can be sent over, for example, UDP and IP. In the same or another embodiment, the messages exchanged between the AVEPG-CL-S (112) and AVEPG-CL-C (115) can be conveyed over, for example, HTTP and TCP/IP, using an XML encoding.

In the same or another embodiment, media traffic related improvements can be implemented. Very often, TV programs are viewed by multiple TV viewers simultaneously. Technologies such as IP multicast (RFC 3170) and the group features of RTP (RFC3550) have been devised to efficiently support mass-distribution of the same media stream. According to the embodiment, the server can identify those media streams that, in the absence of improvements, would be streamed out more than once at the same time. If the server (101) detects such a situation, assuming that the network (102) supported the required feature, the server (101) can consolidate requests for the streaming of certain video content, and send that video content over IP multicast rather than point-to-point. The server (101) further instructs the clients (103) involved to receive the video content from a certain multicast address, so that the clients (103) can join the appropriate multicast group using, for example, IGMP [RFC 2236].

Using a single server to provide AVEPG and video content information for millions of clients and users can be challenging, both from a computational complexity viewpoint and with respect to the connectivity the server would require. Accordingly, as it is common practice with high volume Internet servers, a distributed architecture can be advantageous in some scenarios.

Figure 2:
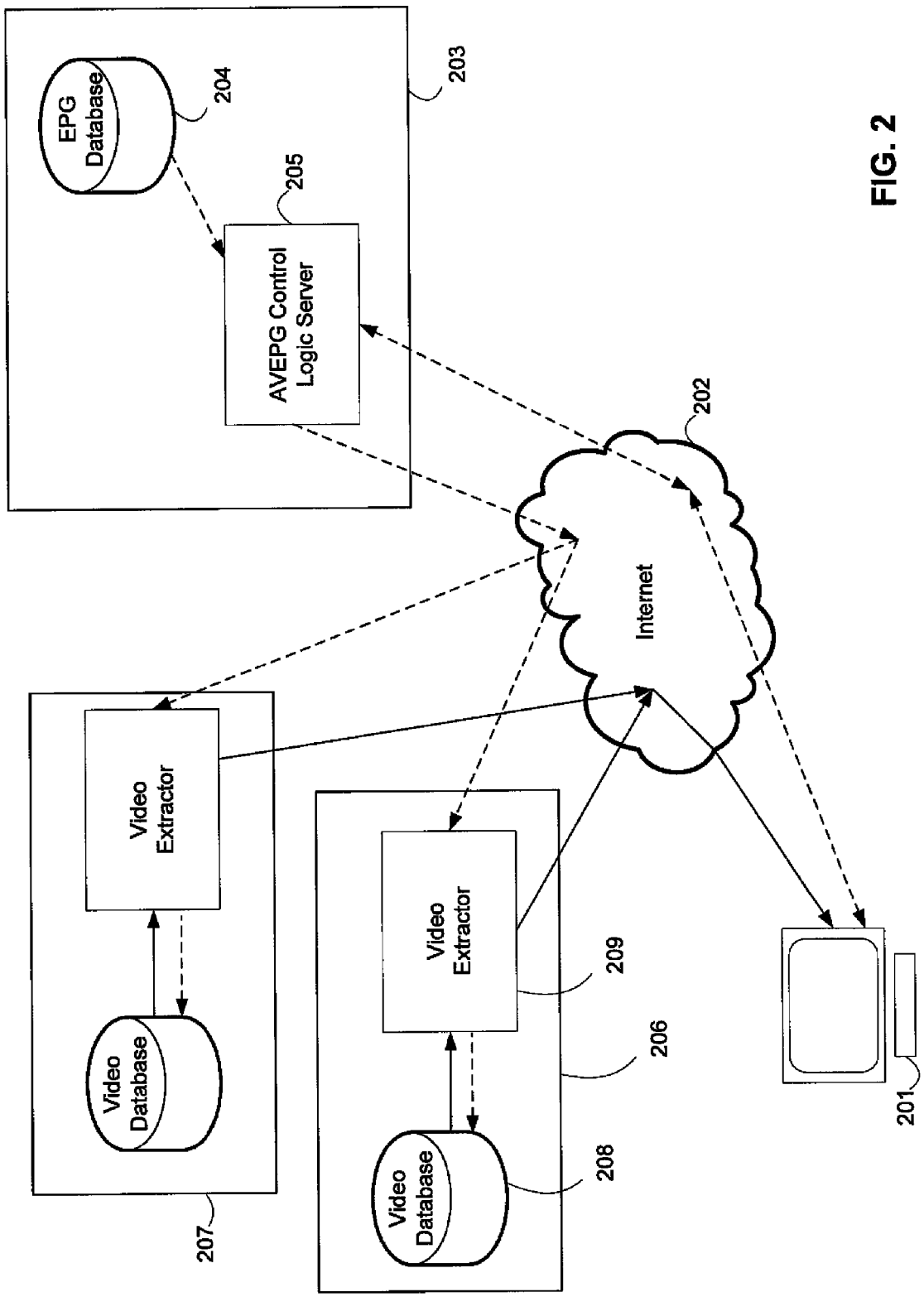
FIG. 2 is a block diagram illustrating an exemplary system for distribution and display of AVEPG audio-visual signals where the server is distributed, in accordance with the present invention.

FIG. 2 depicts one exemplary distributed server architecture. Some or all control traffic from the clients (201) (illustrated here as only a single client for clarity) is conveyed over a suitable network (202) and can be handled by an AVEPG server (203). The AVEPG server can also be distributed using techniques well known from web server deployment (not depicted). The AVEPG server (203) can include, for example, an EPG database (204) as well as an AVEPG-CL-S (205). The mechanisms implemented in those two sub-components can be similar to those discussed above, except that the EPG database (204) also includes location information as to where the programming can be obtained. This information can be in the form of Unified Resource Information (URI), and there can be individual URIs for each layer of the content. When the AVEPG-CL-S (205), based on the request from a user and conveyed through the messaging path already discussed above, learns that the user wishes to receive certain video content, the AVEPG-CL-S (205) uses the location information to address one of potentially multiple media servers (206, 207) that are concerned with media storage and distribution. Each media server (206) can include, for example, a layered encoder, a layered transcoder, and/or other components (none depicted) to populate its video database (208). The media server (206) can also include a video extractor (209) that performs similar tasks as those performed by the local video extractor discussed above in conjunction with FIG. 1. One difference between the distributed architecture of FIG. 2 and the monolithic architecture of FIG. 1 is that the messages sent by the AVEPG-CL-S (205) to the appropriate video extractor (209) in the distributed architecture are being sent through the network (202), which can be the Internet or any other suitable network or combination of networks.

The video extractor (209) extracts the requested content from the video database (208) according to the instructions received from the AVEPG-CL-S (205), and conveys the media data to the client(s) (206, 207).

Figure 3:
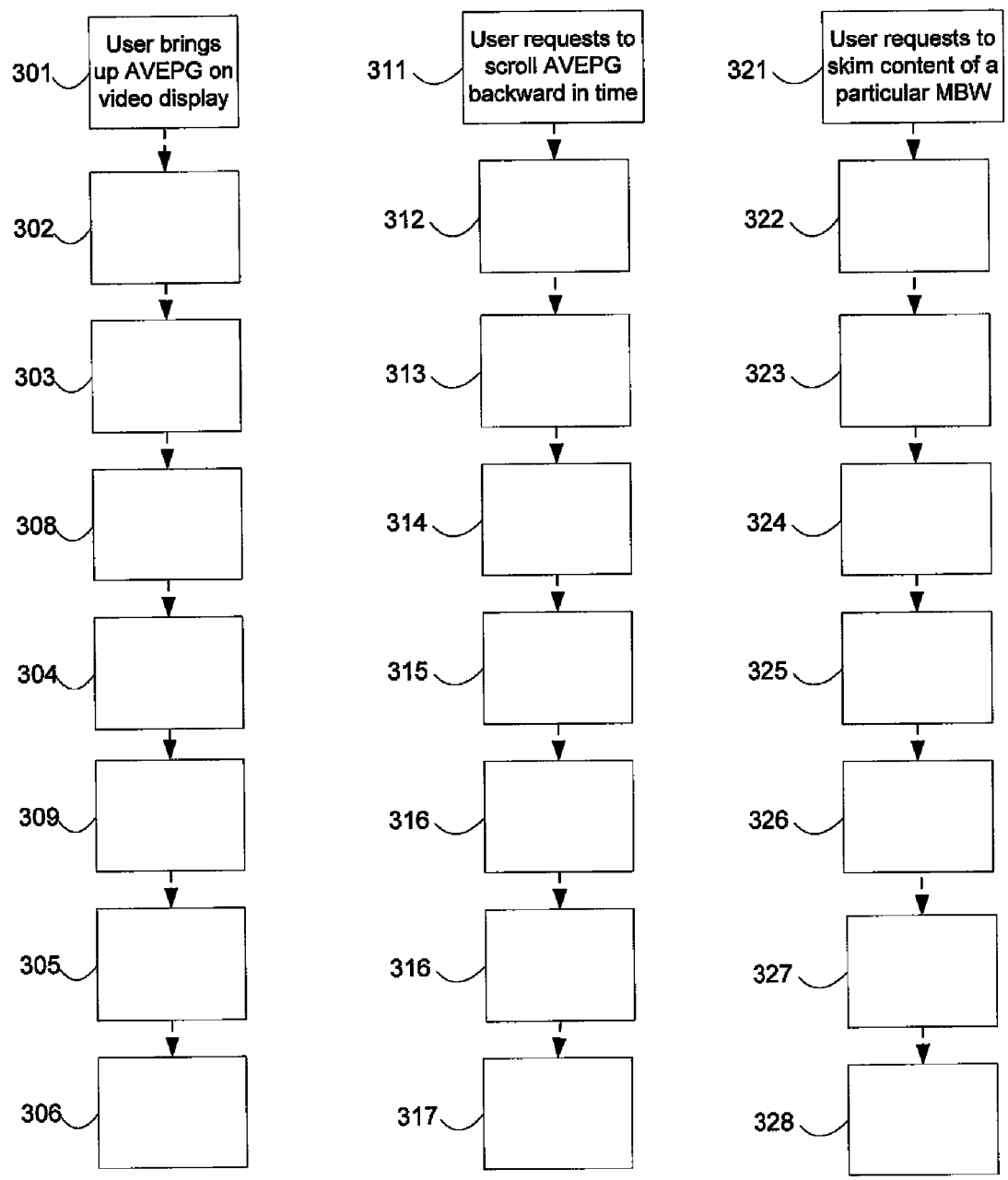
FIG. 3 is a flow diagram illustrating a method in accordance with the present invention.

An exemplary interaction of a user with an AVEPG system, and the system's internal operation upon the user interaction, shall now be described in more detail. Referring to FIG. 3, a user can perform (301) an input activity using an input device, such as, for example, pressing a button on his/her remote control to start the AVEPG system (much like EPG systems are started on set-top-boxes in prior art systems). In response to user input, the GUI sends (302) messages to both the display manager to instruct it to prepare to receive MBWs from the network, as well as to the AVEPG-CL-C to request the default MBWs; these actions can be performed simultaneously or as part of the same step. The AVEPG-CL-C, after checking internally whether the channels to be displayed in MBW are available to the user, and are not, for example, blocked by parental control, can request (303) the local EPG database to obtain the default configuration, or the AVEPG-CL-C can obtain the default configuration through other local means (i.e. hard configuration), and send the request for the presentation of the default configuration to the AVEPG-CL-S. Alternatively, the AVEPG-CL-C can send an abstract request to the AVEPG-CL-S for the presentation of the default configuration, and the AVEPG-CL-S can obtain the details of this default configuration either through hard configuration, or by consulting the EPG database. The AVEPG-CL-S receives (308) this request, and acts on it by translating the abstract requests received from the AVEPG-CL-C into the detailed information required by the video extractor. The AVEPG-CL-S then forwards (304) one or more requests for the sending of one or more layers of video for each MBW in the default configuration to the video extractor. The video extractor communicates (309) with the video database to request the relevant layers of video, for example in the form of file downloads or in the form of streaming video bits. The choice between file download from the video database and streaming video bits from the video extractor depends on factors such as whether the content is live video (in which case streaming is appropriate), or short, pre-recorded footage (in which case a file download may be more suitable). Once the video bits of at least one of the requested layers starts arriving at the video extractor, the video extractor streams (305) them over the network to the client. In the client, the display manager receives (306) the streamed video bits, decodes them, and presents them through the GUI on the video display screen.

Figure 4:
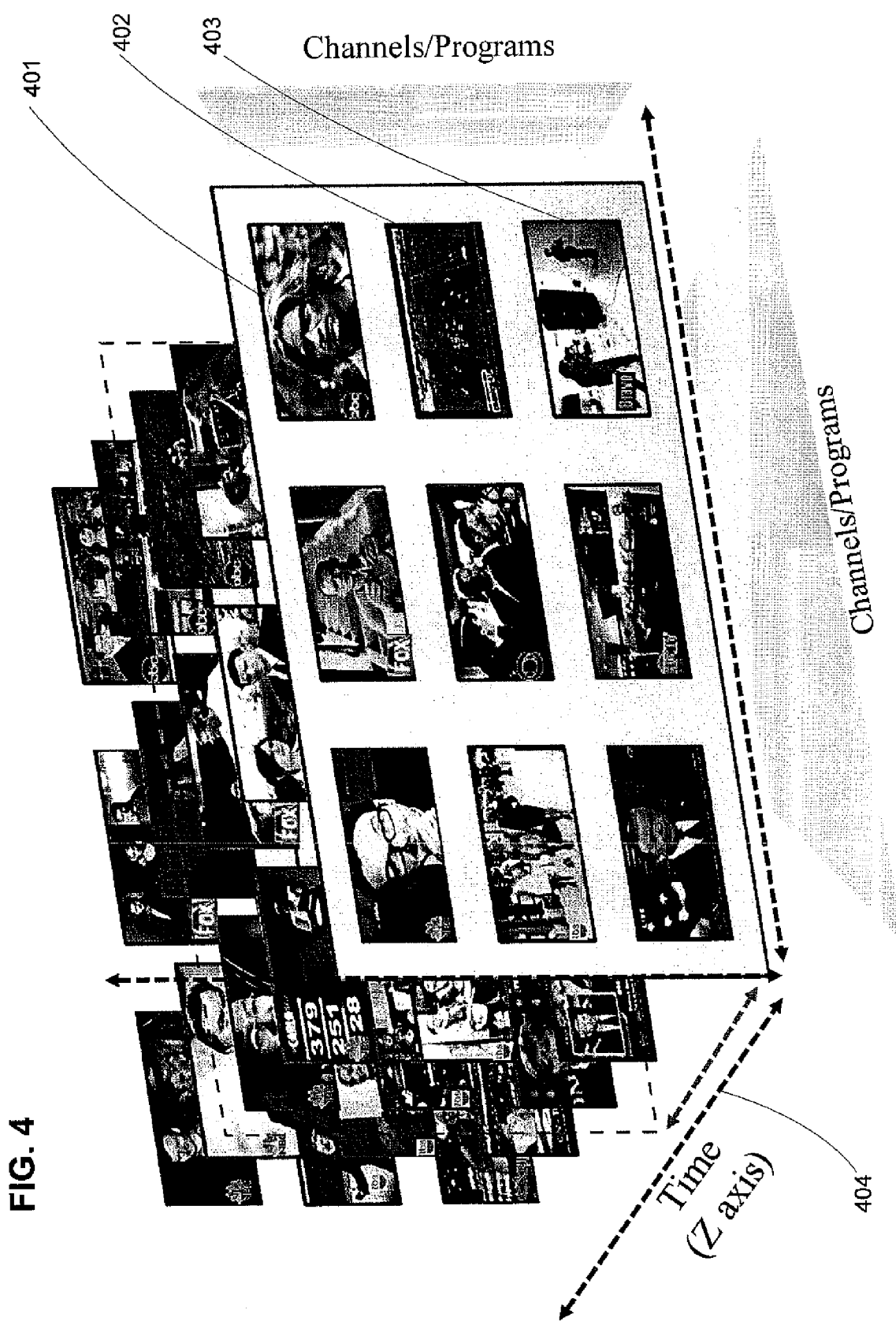
FIG. 4 is an exemplary 3-dimensional video display screen of the AVEPG in accordance with the present invention

FIG. 4 depicts an exemplary screen layout of an AVEPG default configuration screen that can be displayed after the previous process has been executed. A two-dimensional grid of MBWs (401, 402, 403) can be displayed and visible on the screen. Each MBW shows a motion video of the channel/program. The MBWs can be arranged on the X and Y axis according to different criteria such as: channel "type" (e.g., sports, news, drama, sitcom) on the Y-axis and user's preference (as determined, e.g., by usage statistics of that user) on the X-axis; pre-configured location of MBWs according to the service provider's commercial choice; free configuration by the user (i.e., the user can, for example, drag each available channel to each available MBW position), and so on.

FIG. 4 also illustrates the time axis (Z-axis) (404). In an exemplary embodiment, a user can "scroll" through time, using an input device. Scrolling backward through time shall be discussed briefly; scrolling forward operates analogously.

Returning to FIG. 3, a user can request (311) through the input device a scroll back in time of, for example, 10 minutes. The GUI is aware through its internal logic that this request concerns all MBWs. Therefore, the GUI sends (312) one or more messages to the AVEPG-CL-C to request to scroll back all MBWs by 10 minutes. The AVEPG-CL-C communicates (313) the request to the AVEPG-CL-S after having checked internally whether the channels currently being displayed in MBWs are available to the user at the requested time (i.e., 10 minutes earlier). For example, if a certain entertainment channel, at the current point in time, broadcasts a show appropriate for all ages, whereas 10 minutes ago the channel would have broadcasted a show only suitable for adults, and the user's parental control is set to block adult programming, the scroll back would not be granted for this MBW. In that situation, the AVEPG-CL-C can communicate to the AVEPG-CL-S that it should display an indication in the MBW that the channel is being blocked because of parental control settings.

On the server side, the AVEPG-CL-S receives the request(s) from the AVEPG-CL-C, checks permissions, and instructs (314) the video extractor to extract the appropriate channels at the requested time. The video extractor can request (315) the relevant media streams at the relevant time from the video database if the relevant video bits are not already available in its internal cache. Once the video bits become available, the video extractor streams (316) the bits out over the network to the client. In the client, the normal display process of MBW continues (317) as previously discussed above; with the exception of the GUI, the change in time can be transparent to the client's internal state.

The concept of video skimming has been disclosed in detail in co-pending U.S. patent application Ser. No. 12/765,815. In the context of an AVEPG, skimming can result from a user interaction as follows. A user can enable skim mode for an MBW by, for example, pressing a "skim" button on his/her remote control while the cursor is over an MBW or the MBW is otherwise selected, or use another appropriate input technique. After a very brief delay, chapters of the selected channels are displayed in MBWs.

Figure 5:
FIG. 5 is an exemplary 2-dimensional video display screen of the AVEPG in skimming mode in accordance with the present invention.
Figure 5:
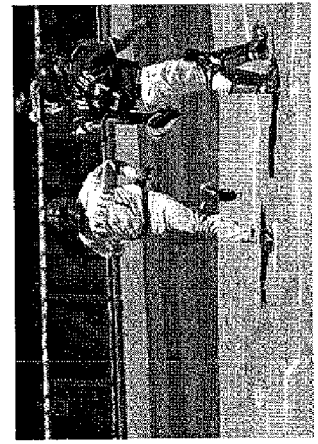
Figure 5:
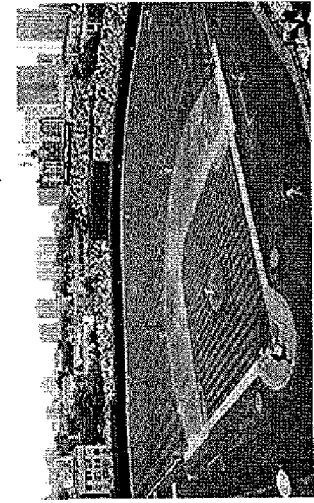
Figure 5:
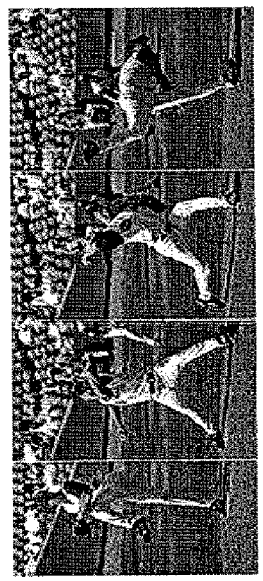

Referring to FIG. 5, the user can select, for example, an MEW displaying a TV channel with baseball video content, or the "baseball channel". This, and the current time, can be displayed in the headline (501), along with programming information (502) such as the current teams playing in the game displayed in the MBWs, here, the Red Sox and Yankees. As an example, four chapters can be displayed using one of the methods disclosed in co-pending U.S. patent application Ser. No. 12/765,815. In particular, one MBW can display round 1 (e.g., the first inning) (503), a second MBW can display round 2 (e.g., the second inning) (504), a third MBW can display notes, news, or other commentary (505), and a fourth MBW can display key pitching scenes (506). The user can, for example, select the key pitching scenes (506) for further skimming, and can use the slider (507) to browse through the ballgame's various pitching scenes.

Returning to FIG. 3, in order to implement this skimming functionally, a user first requests (321) skimming through an input device. The request is received by the GUI, which can translate the cursor position to an MBW identification. The GUI sends (322) a message to the display manager to prepare for skimming mode, and the display manager, in turn, prepares for skimming mode and sends (323) a corresponding request to the AVEPG-CL-C. After checking permissions as discussed above, the AVEPG-CL-C obtains (324) chapter information (e.g., skimming markers that separate different chapters, i.e., segments, of the audio-visual content) from the local EPG database. Alternatively, if no chapter information is available locally, the AVEPG-CL-C can create chapter information (e.g., by using fixed-length intervals for each chapter) or make an abstract request for obtaining chapters to the AVEPG-CL-S, which, in turn, can have such chapter information available in its EPG database or can create it. In either case, the AVEPG-CL-C communicates through the network with the AVEPG-CL-S to request (325) the MBW-sized chapters to be streamed to the client, either with details such as the time, or in abstract form. On the server side, the AVEPG-CL-S can translate (326) the incoming requests, instruct the video extractor, and thereby trigger the streaming (327) of video bits through the network back to the client where the video bits are then received by the display manager, decoded and presented (328) through the GUI on the video display screen, as previously discussed above. The AVEPG system can also implement functionalities to stream audio that is associated with the video content displayed in an MBW selected by a user, or with video content that is displayed full screen and in full resolution. The mechanisms involved in these transactions have been disclosed in detail in co-pending U.S. patent application Ser. No. 12/765,767. The interaction between AVEPG-CL-C and AVEPG-CL-S has been disclosed by referring abstractly to messages and communications. Co-pending U.S. patent application Ser. No. 61/264,466 discloses a protocol that can be used for communicating messages and communications, and also discloses message formats that can be used for this purpose. The use of this or other appropriate protocols can include acknowledge and other messages that do not necessarily always flow in the same direction as disclosed so far.

What is claimed is:

1. A method for producing a customized display of audio-visual content for at least one channel in an Active Video Electronic Programming Guide (AVEPG) system, comprising:
    a. processing one or more user inputs comprising a request for viewing the at least one channel available at a period in time other than the current time;
    b. determining whether the user has access rights to view the at least one channel;
    c. sending one or more control messages in response to the one or more user inputs;
    d. generating audio-visual content for the at least one channel in real-time from content currently being broadcasted;
    e. receiving, in response to the one or more control messages, audio-visual content for the at least one channel, wherein the audio-visual content of the at least one channel comprises video content coded in a base layer and enhancement layer format;
    f. displaying the at least one channel in at least one Mini Browsing Window (MBW) using at least the base layers of the channel, wherein the at least one MBW displays the at least one channel available at the period in time other than the current time; and
    g. generating metadata related to the at least one channel.

2. The method of claim 1, wherein the receiving, in response to the one or more control messages, audio-visual content for the at least one channel, wherein the audio-visual content of the at least one channel further comprises audio content.

3. The method of claim 2, further comprising extracting the audio-visual content from a local database.

4. The method of claim 2, further comprising extracting the audio-visual content from a live feed.

5. The method of claim 2, further comprising extracting the audio-visual content from a digital video storage interface.

6. The method of claim 1, wherein the generating metadata comprises generating information available from the service provider.

7. The method of claim 6, further comprising extracting the audio-visual content from a remote video database.

8. The method of claim 1, wherein the generating metadata comprises generating locally stored information.

9. The method of claim 1, wherein the one or more user inputs comprise a request for viewing audio-visual content for at least one channel in MBWs.

10. The method of claim 1, wherein displaying the at least one channel further comprises displaying the at least one channel in the at least one MBW using only base layers of the at least one channel.

11. The method of claim 1, further comprising extracting the audio-visual content from a local database.

12. The method of claim 1, further comprising extracting the audio-visual content from a live feed.

13. The method of claim 1, further comprising extracting the audio-visual content from a digital video storage interface.

14. The method of claim 1, further comprising extracting the audio-visual content from a remote video database.

15. The method of claim 1, wherein the one or more user inputs comprise a request for skimming a video program displayed in a selected MBW, and wherein displaying the least one channel comprises displaying at least one chapter of the video program.

16. The method of claim 15, further comprising extracting the audio-visual content from a local database.

17. The method of claim 15, further comprising extracting the audio-visual content from a live feed.

18. The method of claim 15, further comprising extracting the audio-visual content from a digital video storage interface.

19. The method of claim 15, further comprising extracting the audio-visual content from a remote video database.

20. One or more computer readable media for performing a method for producing a customized display of audio-visual content for at least one channel in an Active Video Electronic Programming Guide (AVEPG) system, comprising:
    a. processing one or more user inputs comprising a request for viewing the at least one channel available at a period in time other than the current time;
    b. determining whether the user has access rights to view the at least one channel;
    c. sending one or more control messages in response to the one or more user inputs;
    d. generating audio-visual content for the at least one channel in real-time from content currently being broadcasted
    e. receiving, in response to the one or more control messages, audio-visual content for the at least one channel, wherein the audio-visual content of the at least one channel comprises video content coded in a base layer and enhancement layer format;
    f. displaying the at the least one channel in at least one Mini Browsing Window (MBW) using at least the base layers of the channel, wherein the at least one MBW displays the at least one channel available at the period in time other than the current time; and
    g. generating metadata related to the at least one channel.

21. The computer readable media of claim 20, wherein the receiving, in response to the one or more control messages, audio-visual content for the at least one channel, wherein the audio-visual content of the at least one channel further comprises audio content.

22. The method of claim 21, further comprising extracting the audio-visual content from a local database.

23. The method of claim 21, further comprising extracting the audio-visual content from a live feed.

24. The method of claim 21, further comprising extracting the audio-visual content from a digital video storage interface.

25. The method of claim 21, further comprising extracting the audio-visual content from a remote video database.

26. The method of claim 20, wherein the generating metadata comprises generating information available from the service provider.

27. The method of claim 20, wherein the generating metadata comprises generating locally stored information.

28. The method of claim 20, wherein the one or more user inputs comprise a request for viewing audio-visual content for at least one channel in MBWs.

29. The method of claim 20, wherein displaying the at least one channel further comprises displaying the at least one channel in the at least one MBW using only base layers of the at least one channel.

30. The method of claim 20, further comprising extracting the audio-visual content from a local database.

31. The method of claim 20, further comprising extracting the audio-visual content from a live feed.

32. The method of claim 20, further comprising extracting the audio-visual content from a digital video storage interface.

33. The method of claim 20, further comprising extracting the audio-visual content from a remote video database.

34. The method of claim 20, wherein the one or more user inputs comprise a request for skimming a video program displayed in a selected MBW, and wherein displaying the least one channel comprises displaying at least one chapter of the video program.

35. The method of claim 34, further comprising extracting the audio-visual content from a local database.

36. The method of claim 34, further comprising extracting the audio-visual content from a live feed.

37. The method of claim 34, further comprising extracting the audio-visual content from a digital video storage interface.

38. The method of claim 34, further comprising extracting the audio-visual content from a remote video database.

* * * * *